3,062,831
Patented Nov. 6, 1962

3,062,831
PHTHALOCYANINE DYESTUFFS
Harlan B. Freyermuth, Easton, Pa., and Raymond L. Mayhew, Phillipsburg, N.J., assignors to General Aniline & Film Corporation, New York, N.Y., a corporation of Delaware
No Drawing. Filed Dec. 30, 1959, Ser. No. 862,766
3 Claims. (Cl. 260—314.5)

This invention relates to novel phthalocyanine dyestuffs and more particularly to soluble phthalocyanine dyestuffs capable of dyeing textile fibers in green-blue shades of improved properties and the like.

It is an object of this invention to provide a class of novel phthalocyanine dyestuffs capable of dyeing textile fibers and the like. Another object of this invention is the provision of such a class of dyestuffs which may be employed in dyeing textile fibers to produce dyeings having improved properties such as fastness, and/or brightness and the like. A further object of this invention is to provide water-soluble dyestuff molecules containing nuclearly bound sulfonic acid groups which are conveniently suitable for use of the dyer and which do not precipitate prematurely during dyeing or padding operations. A still further object of this invention is the provision of such a class of dyestuffs which may be readily manufactured without undue degradation of the dyestuff and other undesired effects. Yet another object of this invention is the provision of such a class of dyestuffs which will not be subject to the disadvantages attributable to prior art phthalocyanine dyestuffs. Other objects and advantages will appear as the description proceeds.

The attainment of the above objects is made possible by the present invention which includes the provision of phthalocyanine dyestuffs having the formula

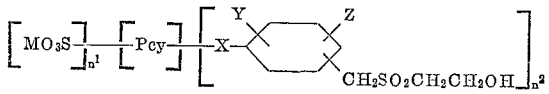

wherein Pcy represents a phthalocyanine molecule; X represents a mono-, di-, or triatomic bridging link; Y and Z are selected from the group consisting of H, lower alkyl, lower alkoxy and —$CH_2SO_2CH_2CH_2OH$; M is a member of the group consisting of H and alkali metal, alkaline earth metal, ammonium and amine cations; $n^1$ has an average value of 0 to 3; $n^2$ has an average value of 1 to 4; and the sum of $n^1$ and $n^2$ is no more than 4.

It has been found that dyestuffs of the above formula are readily and economically manufactured, relatively speaking, and are readily applied from solution to textile fibers and the like by dyeing, padding and printing for the production of improved dyeings. It will be noted that the hydroxyethylsulfonylmethyl groups in these dyestuffs are substituted in pendant aryl nuclei, whereby such dyestuffs may contain a greater number of such groups. This is because the pendant aryl nuclei in the present dyestuffs are much more susceptible of multiple substitution with hydroxyethylsulfonylmethyl groups than are the nuclei in the phthalocyanine molecule per se (the fundamental phthalocyanine nuclei). It is accordingly possible to produce dyestuffs of the present invention having 2 or more hydroxyethylsulfonylmethyl groups substituted in the same aryl nucleus and/or more such groups substituted in the dyestuff molecule than is possible with the prior art dyestuffs.

In the subject deystuffs the presence of a non-removable nuclearly substituted solubilizing group ($SO_3M$) has been found decidedly advantageous in avoiding premature precipitation during the dyeing process. While earlier practice would lead one to believe that retaining a non-removable water-soluble grouping in the dyestuff moiety would impair wash fastness, it has unexpectedly been found that in the case of the subject dyestuff this effect is outweighed by the improved bonding or attraction between the dye and the fiber.

In the above formula, Pcy may represent an unmetallized phthalocyanine molecule or a metal phthalocyanine molecule of known type. As examples of metal phthalocyanine molecules there may be mentioned copper, cobalt, aluminum, vanadium, tin, zinc, nickel, iron, magnesium, chromium and other metal phthalocyanines. Further, Pcy may represent, whether metallized or unmetallized, a phthalocyanine molecule unsubstituted or nuclearly substituted by lower alkyl such as methyl, halogen such as chlorine or bromine, or phenyl. One or a plurality of such substituents may be present. When Pcy represents a phenyl substituted phthalocyanine, none, some or all of the right and left-hand bracketed portions in the above formula may be bonded to the phenyl substituent or substituents.

In the above formula, X preferably represents the diatomic bridging link —$SO_2NR$—, wherein R is alkyl of 1 to 4 carbon atoms, e.g. methyl to butyl or preferably H, as more fully described below. However, the identity of X is not too critical, and may also represent other known equivalent mono-, di-, or triatomic bridging links suitable for connecting the pendant aryl nuclei in the present compounds to the fundamental aryl nuclei of the phthalocyanine molecule. Examples of such bridging links joining pendant aryl nuclei to the fundamental phthalocyanine nuclei are disclosed in U.S. Patents 2,795,-584, 2,795,583, 2,542,328, 2,479,491, etc. Illustratively, other suitable bridging links include —O—, —NR—, —$NRSO_2$—, $SO_2NHNH$—, —$CH_2$—, $C_2H_4$—, —$CH_2SO_2$—, $CH_2NR$—, —$CH_2S$—, —$CH_2O$—, —CO—, —S—, —CONH—, —NHCO—, and —$SCH_2$—, the actual linking atoms in such bridging links being generally C, S, O or N or any combination thereof. Methods for producing dyestuffs of the present type containing such bridging links are disclosed in the aforementioned patents and will otherwise become apparent to persons skilled in the art.

As shown in the above formula, Y and Z may represent H, lower alkyl such as methyl and ethyl, lower alkoxy such as methoxy and ethoxy, and the hydroxyethylsulfonylmethyl group. M may represent H, sodium, potassium, lithium, calcium, barium, magnesium, ammonium, mono-, di-, and tri-ethanol-, -propanol-, -methyl-, -ethyl-, and -propyl-amines, cyclohexylamine, morpholine, pyridine, picoline, and the like. It will be understood that the products of this invention will comprise mixtures of molecules containing different amounts of substituents attached to Pcy in the above formula, and that $n^1$ and $n^2$ represent the average of such substituents therein.

In accordance with the preferred embodiment of this invention, a phthalocyanine compound, unmetallized or metallized and unsubstituted or substituted, as above described, is reacted in known manner with chlorosulfonic acid to introduce from 1 to 4 sulfonyl chloride groups and 0 to 3 sulfonic acid groups, the sum of these sulfonyl chloride and sulfonic acid groups introduced into any single phthalocyanine molecule being no more than 4. This sulfonyl chloride-containing derivative may then be reacted with an intermediate having the formula shown in the right-hand bracketed portion, X being amino, whereby the desired dyestuff is produced by reaction between the sulfonyl chloride groups of said derivative and the amino groups of the intermediate, with elimination of HCl. At least one molecule of the said intermediate and preferably the number of molecules of such intermediate equal to the number of sulfonyl chloride groups in said derivative ($n^2$) are employed in this reaction. Desirably at least one of Y and Z in the intermediate is

—CH$_2$SO$_2$CH$_2$CH$_2$OH

The sulfamidation reaction is, in instances wherein the said intermediate is not sufficiently soluble in aqueous media, preferably carried out in the presence of a water-miscible organic solvent for said intermediate. As examples of suitable mutual solvents, there may be mentioned methanol, ethanol, butanol, Cellosolves (lower alkyl and benzyl ethers of ethylene glycol), Carbitols (lower alkyl ethers of diethylene glycol), dioxane, acetone, methyl ethyl ketone, and the like. An organic or inorganic acid binding agent of known type is also preferably included in the reaction mixture. Pyridine and other organic bases have the added advantage of serving simultaneously as mutual solvent and acid-binding agent. The acid binding agent neutralizes the by-product HCl and prevents formation of the unreactive HCl salt of the amine intermediate.

In accordance with the above-described preferred embodiment, dyestuffs of the present invention may be prepared by reacting 5-amino-2-methyl-m-xylylene-$\alpha^1,\alpha^3$-bis-(2-sulfonylethanol), with chlorosulfonated copper phthalocyanine. No claim is herewith made to the novel 5-amino-2-methyl-m-xylylene - $\alpha^1,\alpha^3$-bis(2-sulfonylethanol), which may be prepared by bischloromethylating 4-nitrotoluene in sulfuric acid or chlorosulfonic acid, condensing the resulting bischloromethylated derivative with mercaptoethanol, oxidizing the sulfide through the sulfoxide to the sulfone, and finally reducing the nitro derivative to the corresponding amine.

The phthalocyanine precursor may be reacted in known manner with chlorosulfonic acid, for example as described in U.S. 2,219,330, to produce the desired derivative containing at least one and up to 4 sulfonyl chloride groups. This reaction is generally carried out at elevated temperatures, generally above 100° C. and preferably in the presence of some phosphorus pentachloride. The chlorosulfonated intermediate is then isolated by drowning the reaction mixture in ice and filtering off the precipitated product. The product may contain an average of 0 to 3 sulfonic acid groups and 1 to 4 sulfonyl chloride groups, depending upon variations in reaction conditions, particularly the temperature and ratios of reactants in the chlorosulfonation process. Preferably, conditions are employed whereby the chlorosulfonated phthalocyanine contains at least one sulfonic acid group, thereby increasing the adaptability of the dyestuff for dyeing purposes in that precipitation of the dyestuff during dyeing is minimized or prevented. In any event, in the subsequent sulfamidation reaction, some of the sulfonyl chloride groups in the chlorosulfonated phthalocyanine will tend to be hydrolyzed in the aqueous medium employed to form nuclearly substituted sulfonic acid groups. Alternatively, the dyestuff if devoid of sulfonic acid groups, can be subsequently sulfonated prior to use for dyeing textile fibers and the like.

As stated above, other derivatives, intermediates and methods may be employed for introducing hydroxyethylsulfonylmethyl-substituted pendant aryl nuclei into the phthalocyanine molecule through the various types of bridging links. Illustratively, a phthalocyanine compound may be chloromethylated, and the chloromethyl-substituted phthalocyanine reacted with an aminobenzene compound containing at least one hydroxyethylsulfonylmethyl group, to produce the corresponding hydroxyethylsulfonylmethyl-containing dyestuffs in accordance with the present invention. In this instance, the bridging link X is the group —CH$_2$NH—.

As another illustration, the above mentioned 5-amino-2-methyl-m-xylylene-$\alpha^1,\alpha^3$-bis(2-sulfonylethanol) may be diazotized and reduced in known manner to produce the corresponding hydrazine, which hydrazine derivative may then be reacted with the chlorosulfonated phthalocyanine with the elimination of HCl. In this instance, the bridging link X is triatomic, namely —SO$_2$NHNH—.

As still another illustration, the above mentioned 5-amino-2-methyl-m-xylylene - $\alpha^1,\alpha^3$-bis(2-sulfonylethanol) may be reacted with a brominated phthalocyanine, with elimination of HBr. In this instance, the bridging link X is monoatomic, namely —NH—. The product is then nuclearly sulfonated as described above.

The dyestuffs of this invention have been found to be highly effective for dyeing and printing natural and synthetic cellulose and polyamide fibers, particularly wool, in green to blue shades of good to excellent fastness properties such as wash-fastness and the like. The fibrous material may be in any of the usual forms, as for example in the form of staple fiber or continuous filaments in bulk form or in the form of tow, rope, yarns, slubbings, warps, fabrics, felts and the like, and treated as a wound package running lengths, fibrous stock, bulk, etc.

Natural protein fibers such as silk, goat and other animal hair, particularly wool may be dyed or printed with the dyestuffs of the present invention. Also suitable for dyeing are artificial regenerated protein fibers such as casein, zein, or soya bean or the like, such regenerated protein fibers being preferably of the hardened type as obtainable for example by acetylation or treatment with formaldehyde.

Synthetic polyamide fibers which may be dyed or printed with the dyestuffs of this invention include the various nylons or linear superpolyamides including nylon 66, nylon 6, nylon 610, Perlon L and T, Silon, Steelon, and Furon, and polyurethanes, and the like. The fibers should contain at least 75% of the aforementioned polymeric materials (superpolyamides, polyurethanes, etc.) admixed if desired with known plasticizers, dye receptive agents, and other functional agents. These polymeric substances may be in the form of homopolymers, copolymers, terpolymers, and other interpolymers, and graft derivatives and/or mixtures thereof.

The dyestuffs of this invention enable the production of dyeings having excellent fastness to wash, light, crocking, and acid and alkaline perspiration.

The following examples are only illustrative of the present invention and are not to be regarded as limitative. All parts and proportions referred to herein and in the appended claims are by weight unless otherwise indicated.

*Example 1*

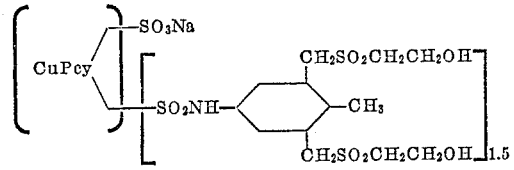

A. *Chlorosulfonation.*—10 parts of phosphorus pentachloride are gradually added and dissolved in 177 parts chlorosulfonic acid at room temperature with stirring. After complete solution is obtained, 29.8 parts copper phthalocyanine are added portion-wise to the chlorosulfonic acid mixture during a one-half hour period. The temperature rises to 74° C. during the addition. The reaction mixture is then heated to 120° C. and held at 120° C. for three hours. The chlorosulfonation reaction mixture is cooled to 45° C. and drowned into 900 parts of ice. The precipitated chlorosulfonated copper phthalocyanine is filtered and the cake washed with 200 parts cold (0–5° C.) water and sucked as dry as possible. 174 parts of wet press cake are obtained by this process.

B. *Sulfamidation.*—17.6 parts 5-amino - 2 - methyl-m-xylylene-$\alpha^1,\alpha^3$-bis-(2-sulfonylethanol) are dissolved by warming (40–50° C.) in a solution of 76 parts of pyridine and 150 parts water. The mixture is cooled to room temperature and 87 parts of the above wet copper phthalocyanine sulfochloride cake are added gradually and stirred at room temperature overnight. The mixture is acidified by gradually adding 119 parts concentrated hydrochloric acid (specific gravity 1.188) and simultaneously diluted by the addition of 500 parts of ice and water. The precipitated sulfonamide is filtered and the cake washed with 100 parts 20% sodium chloride solution. After drying in a vacuum oven at 85° C., 37.6 parts of the sulfonamide derivative of copper phthalocyanine are obtained, containing an average of about 1 sulfonic and 1.5 bis-hydroxyethylsulfonylmethyl-substituted pendant aryl nuclei per molecule.

10 parts of wool fabric are manipulated in a boiling solution containing 0.1 part of this dyestuff and 300 parts of a 2% solution of formic acid for one hour. The dyed wool is rinsed in cold water and dried. The wool is dyed a bright greenish-blue shade having excellent fastness properties.

*Example 2*

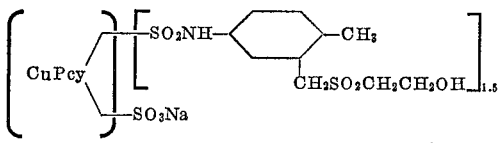

The process of Example 1 is repeated except that an equivalent amount of 4-amino-α²-o-xylyl-2-sulfonylethanol is employed instead of the 5-amino-2-methyl-m-xylylene-α¹,α³-bis-(2-sulfonylethanol). A dyestuff of the above formula is obtained which is somewhat inferior to the dyestuff of Example 1.

*Example 3*

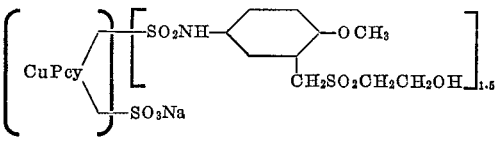

The process of Example 1 is repeated except that an equivalent amount of 3-p-anisidylmethyl-2-sulfonylethanol is employed instead of the 5-amino-2-methyl-m-xylylene-α¹,α³-bis-(2-sulfonylethanol). A dyestuff of the above formula is obtained which is somewhat inferior to the dyestuff of Example 1.

*Example 4*

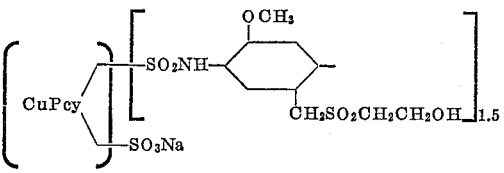

The procedure of Example 1 is repeated except that an equivalent amount of 5-o-anisidylmethyl-2-sulfonylethanol is employed instead of the 5-amino-2-methyl-m-xylylene-α¹,α³-bis-(2-sulfonylethanol). A dyestuff of the above formula is obtained which is somewhat inferior to the dyestuff of Example 1.

This invention has been disclosed with respect to certain preferred embodiments and various modifications and variations thereof will become obvious to persons skilled in the art. It is to be understood that such variations and modifications are to be included within the spirit and scope of this invention. Thus, instead of the mono- and bis-hydroxyethylsulfonylmethyl-containing intermediates employed in these examples, other intermediates containing one to three of such groups may be employed.

We claim:

1. A phthalocyanine dyestuff of the formula

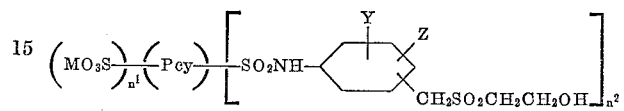

wherein Pcy represents phthalocyanine; Y and Z are selected from the group consisting of H, lower alkyl, lower alkoxy and —$CH_2SO_2CH_2CH_2OH$; M is a member of the group consisting of H and alkali metal, alkaline earth metal, ammonium and amine cations; $n^1$ has a value of 0–3; $n^2$ has a value of 1–4; and the sum of $n^1$ and $n^2$ is no more than 4.

2. A phthalocyanine dyestuff of the formula

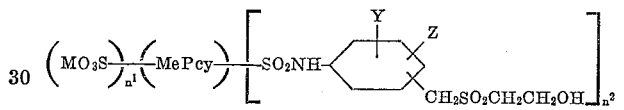

wherein MePcy represents metal phthalocyanine; Y and Z are selected from the group consisting of H, lower alkyl, lower alkoxy and —$CH_2SO_2CH_2CH_2OH$; M is a member of the group consisting of H and alkali metal, alkaline earth metal, ammonium and amine cations; $n_1$ has a value of 0–3; $n_2$ has a value of 1–4; and the sum of $n_1$ and $n_2$ is no more than 4.

3. A phthalocyanine dyestuff of the formula

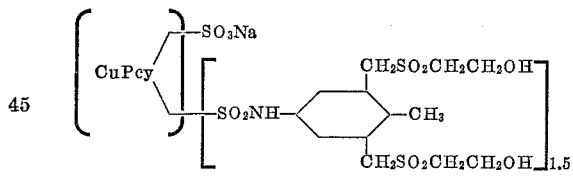

wherein CuPcy represents copper phthalocyanine.

References Cited in the file of this patent

UNITED STATES PATENTS 2,300,572    Hoyer et al. _____ Nov. 3, 1942

OTHER REFERENCES

Migrdichian, Organic Synthesis, Reinhold, New York, vol. 1 (1957), page 483.